United States Patent [19]

Knittel

[11] Patent Number: 5,050,795
[45] Date of Patent: Sep. 24, 1991

[54] PROCESS AND APPARATUS FOR REGULATING AN INTERIOR TEMPERATURE OF A MOTOR VEHICLE

[75] Inventor: Otto Knittel, Soest., Fed. Rep. of Germany

[73] Assignee: Hella KG Hueck & Co., Fed. Rep. of Germany

[21] Appl. No.: 601,356

[22] Filed: Oct. 23, 1990

[30] Foreign Application Priority Data

Oct. 26, 1989 [DE] Fed. Rep. of Germany ....... 3935592

[51] Int. Cl.$^5$ .......................... B60H 1/00; F24F 11/06
[52] U.S. Cl. ..................................... 236/13; 236/49.3; 251/129.05; 318/599
[58] Field of Search ...................... 236/13, 46 F, 49.3, 236/12.11, 12.12, 12.13; 251/129.05, 129.08, 129.11; 237/12.3 A, 12.3 B; 165/35, 36, 42, 43; 318/599

[56] References Cited

U.S. PATENT DOCUMENTS

| | | | |
|---|---|---|---|
| 3,443,121 | 5/1969 | Weisbrod | 236/46 F |
| 4,227,645 | 10/1980 | de La Farge et al. | 236/49.3 |
| 4,368,843 | 1/1983 | Kai et al. | 236/49 |
| 4,611,755 | 9/1986 | Miyanaga et al. | 236/13 |
| 4,698,980 | 10/1987 | Noguchi et al. | 236/49.3 X |
| 4,830,274 | 5/1989 | Johnson et al. | 236/49.3 X |
| 4,871,011 | 10/1989 | Takahashi et al. | 165/43 |

FOREIGN PATENT DOCUMENTS

| | | |
|---|---|---|
| 2920717 | 11/1980 | Fed. Rep. of Germany . |
| 3029097C2 | 4/1987 | Fed. Rep. of Germany . |
| 3612140C2 | 3/1989 | Fed. Rep. of Germany . |
| 3611987C2 | 4/1989 | Fed. Rep. of Germany . |
| 3807731A1 | 9/1989 | Fed. Rep. of Germany . |
| 3110949C2 | 11/1989 | Fed. Rep. of Germany . |

Primary Examiner—Harry B. Tanner
Attorney, Agent, or Firm—Griffin Branigan & Butler

[57] ABSTRACT

According to a process of this invention for regulating an interior temperature of a motor vehicle, a nominal temperature is set, an interior space temperature and an exterior temperature are measured, a motor (M) is synchronously controlled for positioning an adjustable control member (L) which influences the amount of heat fed to an interior space (IR), a first cyclical signal is produced which is applied to a second terminal (B2) of the motor and which influences the creation of a second cyclical signal for driving the motor via a comparator (K), a difference signal is produced from the nominal temperature, the interior space temperature, the exterior temperature, and a position signal which with the comparator produce a third cyclical signal from the second cyclical signal and the difference signal that controls the motor via a first terminal (B1) so that an effective motor current corresponds to a difference between the first cyclical signal and the third cyclical signal.

16 Claims, 2 Drawing Sheets

PROCESS AND APPARATUS FOR REGULATING AN INTERIOR TEMPERATURE OF A MOTOR VEHICLE

BACKGROUND OF THE INVENTION

This invention relates to a process and apparatus for regulating an interior space temperature of a motor vehicle in which a nominal temperature is set, an interior space temperature and an exterior temperature are measured, a motor is synchronously or cyclically controlled, an adjustable control member influences a heat quantity fed into the interior space and in which a first cyclical, beat or pulse signal is created which influences the creation of a second cyclical, beat or pulse signal for controlling the motor via a comparator.

A process and apparatus of the type of this invention is set forth in German Offenlegungschrift DE-OS-29 20 717. In this known apparatus, a first pulse generator is connected to a second pulse generator as well as to a third pulse generator. The pulse generators are rectangular signal generators. An interior space temperature sensor and an exterior temperature sensor are coupled to the second pulse generator. A nominal temperature provider is coupled to the third pulse generator. Outputs of the second pulse generator and the third pulse generator are coupled to a comparator which controls a motor which, in turn, moves an adjustable control member for influencing the amount of heat fed to the interior space. In addition, the first pulse generator is coupled to the comparator.

The first pulse generator delivers pulses of equal width, each beginning with the end of a comparable pulse from the comparator. In accordance with this input signal, the first pulse generator controls the second and third pulse generators. The pulse width which the second pulse generator creates is therefore proportional to the interior space temperature and the exterior temperature. The width of the pulse from the third pulse generator is proportional to the set nominal temperature. The pulses from the second and third pulse generators are compared by the comparator. The comparator forms a difference pulse through which the motor is cyclically or synchronously controlled. According to the necessary running direction of the motor a respective terminal of the motor is grounded while the other terminal of the motor is controlled with the difference pulse.

A disadvantage of this apparatus is that three pulse generators are necessary for synchronous control of the motor so that manufacture of apparatus for carrying out this process is expensive.

This known process, and apparatus for carrying out this process, is also disadvantageous in that when regulating the interior space temperature no position signal of a motor and/or an adjustable control member is respected so that it is not possible to quickly and exactly regulate and set the amount of heat fed to the interior space nor does such regulation have sufficient stability.

Thus, it is an object of this invention to provide a process and an apparatus for regulating the interior space temperature of a motor vehicle which by economizing parts can be quite easily and cost effectively carried out and produced and which provides quick, simple, and exact interior space temperature dependent upon a predetermined nominal temperature, a measured interior space temperature, a measured exterior temperature, and a position signal of an adjustable control member.

SUMMARY OF THE INVENTION

According to principles of this invention, a difference signal is produced from a nominal temperature, an interior space temperature, an exterior temperature and a position signal of an adjustable control member; a first cyclical signal is fed to a second terminal of a motor and is used to synchronize a second cyclical signal; and a comparator produces a third cyclical signal from the second cyclical signal and the difference signal which is fed to the motor over a first motor terminal such that an effective motor current corresponds to a difference between the first cyclical signal and the third cyclical signal.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENT

As used herein a cyclical signal includes a pulse, beat, or any other reoccurring and/or alternating signal.

Figure 1:
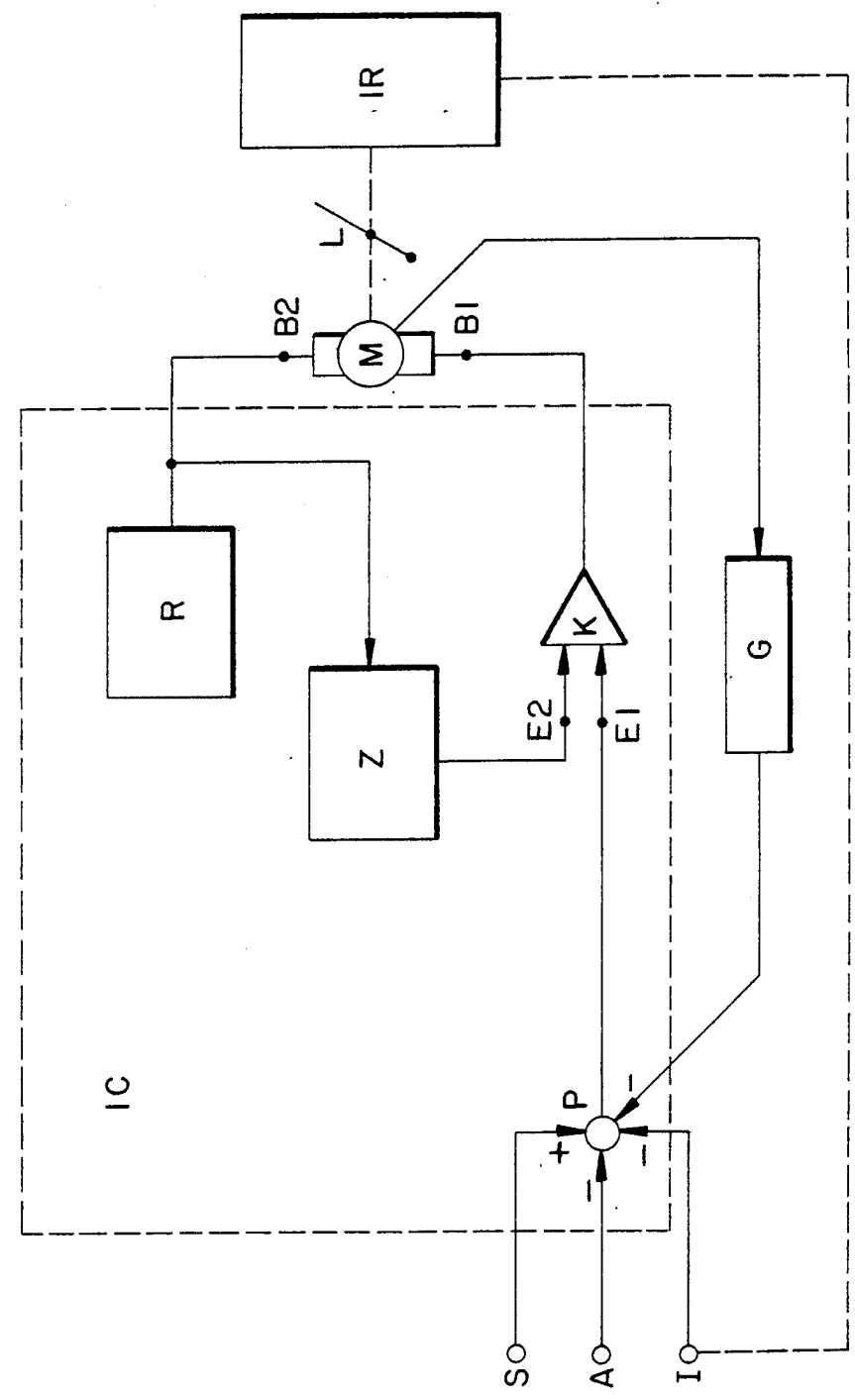
FIG. 1 is a block diagram, with some elements being shown schematically, of a first embodiment inventive apparatus for carrying out a process of this invention.

According to this invention, a subtractor, or adder, P is coupled to a nominal temperature provider S, which can be a potentiometer, with which a nominal temperature for an interior space IR can be set. For measurement of an interior space temperature and an exterior temperature the subtractor P is additionally electrically coupled to an interior space temperature sensor I and with an exterior temperature sensor A. The interior space temperature sensor I and the exterior temperature sensor A can be, for example, thermistors. In order to achieve a quick and exact regulation of the interior space temperature of the interior space IR the subtractor P is additionally coupled to a position signal provider G, which measures the position of an adjustable control member L and feeds a signal to the subtractor P which corresponds to the position of the adjustable control member L. The adjustable control member L, in turn, influences the amount of heat fed to the interior space IR. The position signal provider G can, in an uncomplicated embodiment shown in FIG. 2, be a potentiometer. For a particular exact regulation of the interior space temperature the position signal provider G can also be a counting circuit for measuring rotation of the motor M, which moves, or adjusts, the adjustable control member L, as is depicted in FIG. 1. The adjustable control member L, depending on the manner in which the apparatus for regulating interior space temperature is used, can be an air-mixing baffle for mixing warmed air with cooler air or it can also be a water valve that influences flow of heated water to a heating apparatus. By feeding a nominal temperature signal, an exterior temperature signal and a position signal to the subtractor, a difference signal can be formed in a particularly uncomplicated and cost effective manner which underlies the interior space temperature and which respects all parameters. In this respect, it is particularly beneficial if a difference signal results from feeding a positive nominal-temperature voltage value to the subtractor P while negative signals representative of the interior space temperature, the exterior temperature and the position temperature are fed to the subtractor P, because a particularly uncomplicated and cost effective construction of the apparatus is then possible in which the signal of the nominal temperature serves as an absolute relative value. In another embodiment the nominal temperature, the exterior temperature, the interior space temperature, and the position signal can be fed to the subtractor P as signals with other relative values or signs. In order to guarantee a particularly uncomplicated and cost effective embodiment of the apparatus, each of the nominal temperature provider S and/or the exterior temperature sensor A and/or the interior space temperature sensor I and/or the position signal provider G can be coupled to the subtractor P through an appropriate proportional or matching resistor so that the relationships of these signals, one to the other, can be set in a particularly uncomplicated manner and so that a difference signal coming from the subtractor P does not need to be further influenced or processed for regulating the interior space temperature.

Figure 2:
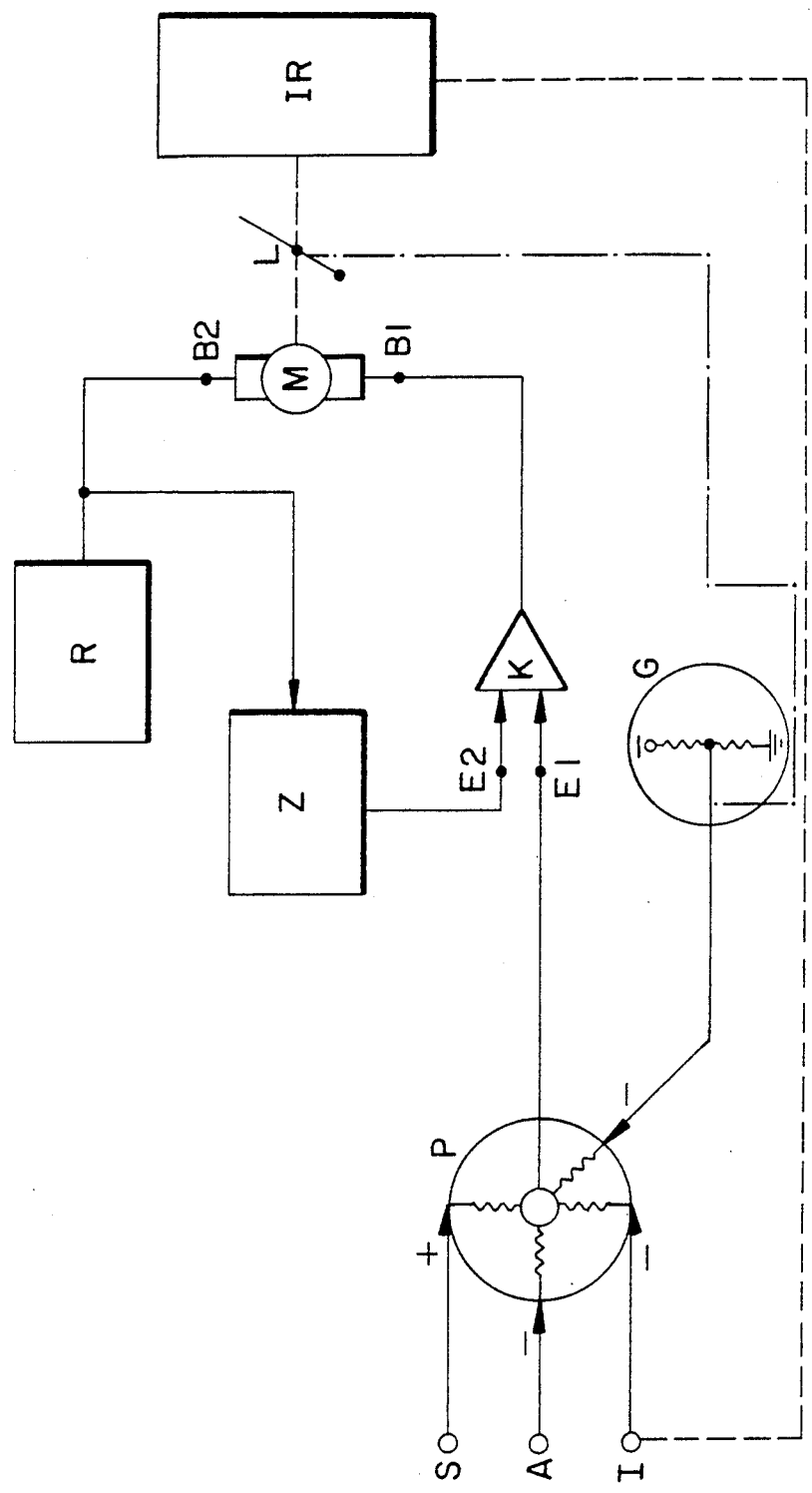
FIG. 2 is a block diagram of the second-embodiment inventive apparatus for carrying out a process of this invention with some electrical and mechanical elements being shown schematically.

In another embodiment, the subtractor P can be constructed of resistors, as depicted in FIG. 2, for the same purpose.

In any case, it must be assured that no false or spurious currents appear in the subtractor P.

The inputs E1 and E2 of the comparator K are arranged to have high resistances.

In this manner it is possible to couple the subtractor directly into the first input E1 of the comparator K so that a particularly uncomplicated and cost effective construction of the apparatus results.

In order to produce a cyclical, synchronized or beat signal from the produced difference signal of the first input E1 of the comparator K for controlling the motor M, the second input E2 of the comparator K here is, for example, electrically connected with a sawtooth-wave generator Z. The output of the comparator K is electrically connected to a first terminal B1 of the motor M. The sawtooth-wave generator Z delivers a sawtooth signal to the second input E2 of the comparator K with a preset amplitude stroke.

The sawtooth-wave generator Z is electrically coupled to a rectangular-wave generator R which produces a first rectangular signal with a preset fixed pulse-pause relationship. This first rectangular signal of the rectangular signal generator R synchronizes the production of sawtooth signals of the sawtooth-wave generator Z. In addition, the rectangular-wave generator R is electrically connected to a second terminal B2 of the motor M in order to cyclically or synchronously control the motor M with the first rectangular signal. The motor M thereby moves, or adjusts, the adjustable control member L to influence the amount of heat fed to the interior space IR. This effect is represented by a dashed line in the drawing. A further dashed line between the interior space temperature sensor I and the interior space IR makes clear in the drawing that the interior room temperature sensor I measures the interior room temperature of the interior room IR. A dash-dot line in FIG. 2 represents a coupling between the position signal provider G and the adjustable control member L. In the other embodiment shown in FIG. 1, in which the position signal provider G is a counter circuit for measuring rotation of the motor M, the position signal provider G can be, for example, a Hall-effect element coupled to the motor M.

In another, not shown, embodiment, the motor M can be controlled by a performance stage which, for example, can comprise two operational amplifiers each of which controls one of the terminals B1, B2 of the motor M.

A process for regulating the interior room temperature with the described apparatus is described in greater detail as follows.

A particular nominal temperature for the interior space IR is set with the nominal temperature provider S. Additionally, the exterior temperature and the interior space temperature are measured. In order to make possible a quick and stable regulation of the amount of heat fed to the interior space IR, the position of the adjustable control member L is measured by the position signal provider G. In a particularly uncomplicated and cost effective manner, a difference signal is formed by the subtractor P from the nominal temperature, the exterior temperature, the interior space temperature, and the position signal which takes into consideration all parameters necessary for regulation of the interior space temperature so that regulation of the interior space temperature can be carried out with only dependence on this difference signal. In this manner, the difference signal can be fed directly into the comparator K for the cyclical or synchronous control of the motor M. For this purpose, the second input E2 of the comparator K is coupled to the sawtooth-wave generator Z which feeds a sawtooth signal to the comparator K for comparison with the difference signal. For control of the motor M with the first rectangular signal, which has a fixed pulse-pause relationship, the second terminal B2 of the motor M is coupled with the rectangular signal generator R which feeds this first rectangular signal to the motor M as a reference signal. The rectangular signal generator R is coupled to the sawtooth-wave generator Z so that the first rectangular signal synchronizes production of the sawtooth signals of the sawtooth-wave generator Z. The first rectangular signal can, for example, can have a synchronous pulse relationship of 1:1. It is possible to also have other pulse relationships. With each leading or trailing edge of the first rectangular signal the voltage of the sawtooth signal is set to zero. In this manner, one achieves a particularly simple synchronization of the sawtooth signal with the first rectangular signal. The comparator K compares the sawtooth signal with the difference signal and delivers a second rectangular signal from its output to control the motor M through its first terminal B1. The amplification or gain is thereby partly determined by the amplitude of the sawtooth signal and partly through the slopes of sensor characteristics, that is of the position signal provider G, of the exterior temperature sensor A, and of the interior space temperature sensor I.

The motor M, which is here, for example, represented as a direct-current motor, has two driving directions and is therefore controlled at its second terminal B2 by the first rectangular signal which has a fixed pulse-pause relationship and is controlled at its first terminal B1 with the second rectangular signal whose pulse-pause relationship depends upon the difference signal appearing at the first input E1 of the comparator. If the first rectangular signal corresponds to the second rectangular signal, no regulation is necessary; that is, the parameters or regulating signals fed to the subtractor are in balance so that an amount of heat is fed to the interior spaced IR via the adjustable control member L which warms the interior space IR to a temperature that corresponds to the nominal temperature set on the nominal temperature provider S and for which also no adjustment of the adjustable control member L, because of the exterior temperature measured by the exterior temperature sensor A, is necessary. When the first and second rectangular signals are the same, the motor M is accordingly idle. The motor M has a preset reaction range; that is, it has an inertia that is determined by mechanics of the motor M so that a small deviation of the first rectangular signal from the second rectangular signal does not cause the motor M to run.

Should the second rectangular signal deviate from the first rectangular signal a greater amount than the preset inertia, or reaction range, and the operating characteristics of the motor, the motor, depending upon a sequence of arrival of the first rectangular signal or the second rectangular signal, that is, in dependence on the difference signal on the first input E1 or the comparator K, will be driven in either the right or the left direction and will adjust the adjustable control member L until this adjustment produces a difference signal from the subtractor P that guarantees a balance of the first rectangular signal to the second rectangular signal so that the motor M is idle and the interior space IR is fed a constant amount of heat that ensures that a set nominal temperature will be held.

Because the first rectangular signal with a fixed pulse-pause relationship is applied to the second terminal B2 of the motor M, the motor M is thereby always driven in a predetermined direction when the difference signal at the first input E1 of the comparator K changes. The change can be thereby determined by an adjustment to the nominal temperature at the nominal temperature provided S, by a change in the exterior temperature measured by the exterior temperature sensor A, or by a change in the interior spaced temperature measured by the interior-space temperature sensor I. By any of these changes of the difference signal which leads to an imbalance between the second rectangular signal and the first rectangular signal, the motor M will be driven until a sufficient amount of head is fed by the adjustable control member L to the interior space to ensure that the nominal temperature is held. That is, an adjustment take places until there is balance between the first and second rectangular signals and the motor M is idle.

The apparatus to carry out this procedure can be set forth in a particularly uncomplicated and cost effective embodiment in which the rectangular-wave generator R, the sawtooth-wave generator Z, the subtractor and/or the comparator K are incorporated into one integrated circuit or chip IC, having output stages at terminals B1, and B2 (see FIG. 1) or are part of a microprocessor which takes over other control and regulation functions.

It is advantageous that a difference signal is produced from the nominal temperature, the interior space temperature, the exterior temperature, and a position signal of the position of an adjustable control member, because in this manner a difference signal that has all of the parameters or data necessary for regulating interior space temperature is produced in an easy and most cost effective manner so that regulation of the interior space temperature can be accomplished in complete dependence on this difference signal.

Because the first cyclical signal controls the motor through a second terminal and synchronizes the second cyclical signal so that the comparator builds a third cyclical signal from the second cyclical signal which controls the motor at a first terminal, and because the effective motor current corresponds to a difference between the first cyclical signal and the third cyclical signal, the advantage of a particularly simple and cost effective operation and construction results since the motor is directly controlled from the first cyclical signal and from the third cyclical signal which is produced in a simple and cost effective manner through the synchronized production of a second cyclical signal, comparison of the second cyclical signal with the difference signal to produce the third cyclical signal.

It is particularly beneficial that a position signal, that represents the position of the adjustable control member, is used to build the difference signal because in this manner a quick and stable regulation of the interior space temperature is assured in a simple and cost effective manner since pulsed or cyclical control of the motor depends upon the position of the adjustable control member to change the amount of heat fed to the interior space.

It is beneficial that the motor, upon balance of the first and third beat or cyclical signals, is idle because in this manner simple regulation, control, and switching are accomplished with costs for apparatus to carry out these functions being decreased.

Because the motor is driven in a right or left direction by imbalance of the first and third beat signals, depending upon a produced difference signal, the benefit of a particularly uncomplicated and cost effective beat, cyclical, or synchronous control of the motor and therewith a particularly simple and cost effective regulation of the interior space temperature is accomplished.

It is beneficial that the regulation operation is ended when the first and third cyclical signals are in balance because in this manner a balanced condition will be accomplished for all of the produced components or parameters of the difference signal in which a predetermined amount of heat will be fed to the interior space by the adjustable control member which ensures that the interior space temperature corresponds to the set nominal temperature.

Because the first cyclical signal has a fixed pulse-pause relationship, the advantage arises that a reference signal is produced in a simple and cost effective manner for control of the motor as well as for synchronizing the second cyclical signal.

It is beneficial that the first cyclical signal is a first rectangular signal that the second cyclical signal is a sawtooth signal or a sine wave signal and that the third cyclical signal is a second rectangular signal with variable pulse-pause relationship because in this manner a particularly uncomplicated and cost effective operation of the process results with the motor being controlled by two rectangular signals and the second rectangular signal being produced in a simple manner through comparison of the synchronously produced sawtooth signal, or sine wave signal, with a difference signal whereby already with a small amplitude stroke of the sawtooth signal a second rectangular signal is produced that assures an accurate control of the motor.

In this regard, it is particular beneficial that the nominal temperature provider, the interior space temperature sensor, the exterior temperature sensor, and the position signal provider which produces a position signal corresponding to the position of the adjustable control member are coupled to a subtractor; that the subtractor is coupled to a first input of the comparator; that the output of the comparator is coupled to the first terminal of the motor; that the first pulse generator is connected to the second terminal of the motor as well as to the first pulse generator; and that the second pulse generator is coupled to an input of the comparator because in this manner apparatus for carrying out the process is produced having an uncomplicated and cost effective structure which by respecting the position signal from the position signal provider for regulation of the interior space temperature assures a quick and stable regulation of interior space temperature without the use of costly parts.

By making the subtractor of resistors as shown in FIG. 2 there is the advantage that a particularly uncomplicated and cost effective linkage between parameters is achieved whereby the signals from the interior space temperature sensor, the nominal temperature provider, the exterior temperature sensor and the position signal provider work together in a simple manner and undesirable currents in the subtractor are reduced.

In this regard, it is particularly beneficial that the inputs to the comparator have high resistances.

It is particularly beneficial that the first pulse generator is a rectangular-wave generator whose rectangular pulse has a fixed pulse-pause relationship because in this simple and cost effective manner a reference signal to control the motor as well as to synchronize the second pulse generator is produced.

Because the second pulse generator is a sawtooth-wave generator or a sine-wave generator the advantage arises that a sawtooth signal, or a sine wave signal, is produced in a simple and cost effective manner which is synchronized with the first rectangular signal and which, through a simple comparison with the difference signal from the subtractor, makes possible the production of a second rectangular signal which guarantees a functioning control of the motor whose turn direction depends upon predetermined parameters.

It is beneficial that the rectangular-wave generator, the sawtooth-wave generator or the sine-wave generator, the subtractor and/or the comparator are combined in an integrated part so that a particularly cost effective and uncomplicated construction is accomplished. The same benefit results if the rectangular-wave generator, the sawtooth-wave generator or sine-wave generator, the subtractor and/or the comparator are part of a microprocessor.

Because the couplings between the rectangular-wave generator and the motor and/or the comparator and the motor are arranged as output stages, the benefit arises that the comparator and/or the rectangular-wave generator do not need to have performance stages. Particularly beneficial is an output stage of two performance operational amplifiers, in which each operational amplifier controls one of the motor terminals.

It is beneficial for the position signal provider to be a potentiometer which is a simple and cost effective manner of providing a position signal of the adjustable control member for the regulation of the interior space temperature.

By making the position signal provider as a counting circuit for rotation of the motor, the benefit arise that the position of the adjustable control member can be determined quite exactly to further improve regulation of interior space temperature.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed or defined are as follows:

1. In a process to control the interior temperature of a motor vehicle, in which a nominal temperature is set and exterior and interior temperatures are measured, in which a motor is cyclically controlled to position an adjustable control member for influencing the quantity of heat channeled to an interior, and in which a first cyclical signal is created which influences the creation of a second cyclical signal to control the motor via a comparator, the improvement wherein:
a difference signal is developed from the nominal temperature, the interior temperature, the exterior temperature and a position signal representing a position of the adjustable control member;
the first cyclical signal is applied to the motor via a second terminal and synchronizes the second cyclical signal, with the comparator receiving the second cyclical signal and the difference signal for forming a third cyclical signal which is applied to the motor via a first terminal, so that an effective motor current corresponds to a difference between the first and third cyclical signals.

2. In a process as in claim 1 wherein the motor is not driven if the first and third cyclical signals are approximately the same.

3. In a process as in claim 2 wherein the motor is driven to the left or right depending upon the produced difference signal.

4. In a process as in claim 3 wherein a control procedure is stopped when the first and third cyclical signals are substantially the same.

5. In a process as in claim 4 wherein the first cyclical signal has a fixed pulse-pause relationship.

6. In a process as in claim 5 wherein the first cyclical signal is a first rectangular signal, the second cyclical signal is a sawtooth or sine signal and the third cyclical signal is a second rectangular signal with a variable pulse-pause relationship.

7. In an apparatus for controlling the interior temperature of a motor vehicle of a type comprising a nominal temperature provider, an interior-space temperature sensor, an exterior temperature sensor, a first pulse generator coupled to a second pulse generator, a comparator fed by the second pulse generator, a motor fed by the comparator which adjusts the position of an adjustable control member for influencing the amount of heat fed to the interior space, the improvement wherein:
the nominal temperature provider, the interior space temperature sensor, the exterior temperature sensor and a position signal provider which creates a signal representative of the position of the adjustable control member are coupled to a subtractor, the subtractor is coupled to an input of the comparator, an output of the comparator is coupled to a first terminal of the motor, the first pulse generator is coupled to a second terminal of the motor as well as to the second pulse generator, and the second pulse generator is coupled to a second input of the comparator.

8. In an apparatus as in claim 7 wherein the subtractor comprises resistors and the first and second inputs to the comparator have high resistances.

9. In an apparatus as in claim 8 wherein the first pulse generator is a rectangular cyclical generator for creating a signal with a fixed pulse-pause relationship.

10. In an apparatus as in claim 9 wherein the second pulse generator is a sawtooth-wave generator or a sine wave generator.

11. In an apparatus as in claim 10 wherein the first and second pulse generators, the subtractor and/or the comparator are formed together on one integrated element.

12. In an apparatus as in claim 11 wherein an output stage is positioned at one of the couplings between the rectangular-wave generator and the motor and the comparator and the motor.

13. In an apparatus as in claim 9 wherein the position signal provider is a potentiometer.

14. In an apparatus as in claim 9 wherein the position signal provider is a counting circuit for measuring the rotation of the motor.

15. In an apparatus as in claim 7 wherein the adjustable control member is an air-mixing baffle.

16. In an apparatus as in claim 7 wherein the adjustable control member is a water valve.

* * * * *